United States Patent [19]

Franke et al.

[11] Patent Number: 4,953,394
[45] Date of Patent: Sep. 4, 1990

[54] DEVICE AND PROCESS FOR CONTROLLING AIR PRESSURE IN TIRES

[75] Inventors: Horst Franke, Aalen; Hans-Jörg Schmid, Aalen-Essingen, both of Fed. Rep. of Germany

[73] Assignee: Alligator Ventilfabrik GmbH, Giengen/Brenz, Fed. Rep. of Germany

[21] Appl. No.: 255,036

[22] Filed: Oct. 7, 1988

[30] Foreign Application Priority Data

Oct. 8, 1987 [DE] Fed. Rep. of Germany ....... 3734053
Aug. 12, 1988 [DE] Fed. Rep. of Germany ....... 3827354

[51] Int. Cl.$^5$ ............................................ B60C 23/02
[52] U.S. Cl. .................................... 73/146.5; 340/448
[58] Field of Search ................. 73/146.5, 146.2, 146.8, 73/146, 725, 728, 729; 340/58, 445, 448; 137/227, 228, 229

[56] References Cited

U.S. PATENT DOCUMENTS

| 3,925,755 | 12/1975 | Hata | 340/445 |
| 4,119,944 | 10/1978 | Smith | 73/146.5 |
| 4,330,774 | 5/1982 | Doty | 340/445 |
| 4,597,286 | 7/1986 | Aguglia | 73/146.5 |
| 4,742,857 | 5/1988 | Gandhi | 73/146.5 |
| 4,807,468 | 2/1989 | Galan | 73/146.5 |

Primary Examiner—Donald O. Woodiel
Attorney, Agent, or Firm—Bachman & LaPointe

[57] ABSTRACT

An apparatus for monitoring the air pressure in a pneumatic tire carried by the rim of a vehicle wheel, comprising a sensing element which is arranged at the rim ring and which can be deformed and acted upon by the tire pressure, with a permanent magnet as the measurement value generator, in the region of rotary movement of which is disposed a measurement value sensor which is fixed to the vehicle in a stationary position and which is connected to an evaluation circuit. The apparatus is reliable in operation and uncomplicated in structure.

21 Claims, 4 Drawing Sheets

DEVICE AND PROCESS FOR CONTROLLING AIR PRESSURE IN TIRES

BACKGROUND OF THE INVENTION

The invention relates to an apparatus and a method of monitoring the air pressure in a pneumatic tire carried by the rim of a vehicle wheel, comprising a sensing element which is arranged at the rim ring and which can be deformed and acted upon by the tire pressure, with a permanent magnet as a measurement value generator, wherein arranged in the region of rotary movement thereof is a measurement value sensor which is fixed to the vehicle in a stationary position and which is connected to an evaluation circuit.

In an apparatus of that kind, as set forth in German laid-open application (DE-OS) No. 30 37 722, the sensing element is in the form of a pressure generator with a suction circuit which can be influenced by the air pressure, being fixed to each tire of a motor vehicle. The pressure generator co-operates with a fixed pick-up which is connected to a free-oscillating oscillator device and to an evaluation circuit for computation and display of the tire pressure.

Such an arrangement suffers from involving very high production costs, for which reason the inventor set himself the aim of providing a simple apparatus of the kind set forth in the opening part of this specification, which is reliable in operation and which is provided with an uncomplicated evaluation device. An essential aspect of the invention is also the provision of an inexpensive apparatus of that kind, and the elimination of uncertainties in electronic monitoring.

Summary of the Invention

That object is attained in that the sensing element is in the form of a bellows mounted with a substantially axis-parallel direction of movement and is connected to the permanent magnet which is displaceable in axis-parallel relationship at the outside of the tire in dependence on the tire pressure, wherein at normal tire pressure the permanent magnet remains in a position close to the measurement value sensor and that spacing is greater at a reduced tire pressure. The stationary pick-up may be a Hall sensor. The latter is an electronic component which produces a voltage by virtue of what is known as the Hall effect, in each case perpendicularly to a flowing current and a magnetic field. The above-mentioned Hall effect is based on the fact that, in electrical conductors which are disposed in a homogeneous magnetic field and in which an electrical current flows perpendicularly thereto, a voltage difference occurs, perpendicularly to the magnetic field and perpendicularly to the current. The magnitude of the effect is dependent on the conductor material and is characterized by the respective Hall constant.

It is known that Hall sensors are low in weight, and the size thereof is only a few $mm^3$, so that they are particularly suitable for the purpose of use intended for the inventor.

In accordance with the invention, with a normal tire pressure, the permanent magnet rests in a position close to the Hall sensor, while upon a reduction in the tire pressure, the spacing between the Hall sensor and the permanent magnet increases.

In order to provide that effect, in an embodiment of the invention the bellows projects from an attachment housing on the rim ring into the tire air space, and the bellows is connected by way of an axial rod or the like to a bistable element which moves a permanent magnet disposed in parallel relationship with the axis; therefore, upon a drop in pressure, the permanent magnet will snap over from the so-called 'good position' into an alarm position, towards the tire, and in so doing will influence the Hall sensor in the manner described.

A preferred embodiment is one in which the bellows is fitted into a sleeve which passes through the rim ring, and the bellows is open towards the tire air space; at its other end which is pressure-tightly closed the bellows carries the permanent magnet which is displaceable in the sleeve and which can thus be moved directly by the bellows upon a change in tire pressure. The bellows itself forms an energy storage means which holds the permanent magnet in a predetermined equilibrium position at normal tire pressure and which pushes it towards the rim when the tire pressure falls.

In accordance with the invention the permanent magnet may have associated therewith a seal which delimits the tire air space in the sleeve and which bears against the inside surface of the sleeve.

In accordance with a further feature of the invention, disposed between the permanent magnet and the above-described Hall sensor is an end wall of the sleeve, which with same and the permanent magnet delimits a sleeve ante-chamber. That sleeve ante-chamber preferably has a venting opening through which air can escape upon a reduction in the volume of the sleeve ante-chamber; the vent opening permits an undamped movement of the bellows.

However, it is also possible for the sleeve ante-chamber to be in the form of an air-free chamber or to have an air cushion so that the movement of the permanent magnet is controlled by the sleeve ante-chamber and the bellows.

Depending on the respective position of the permanent magnet, the Hall sensor signals for example a green continuous signal for a tire pressure of for example over 2 bars. For the range of from 1.8 to 2.0 bars, the green signal repeatedly alternates with a red signal while below 1.8 bars a continuous red signal is triggered as the 'alarm' stage. It will be appreciated that those values may be varied depending on the respective area of use, they are only set forth here as preferred examples.

As already mentioned, the Hall sensor is connected to an evaluation circuit which, in accordance with the invention, has two trigger stages which determine a lower and an upper threshold of the circuit. In the first trigger stage, a check is made as to whether there is any wheel rotation at all. In the second trigger stage, the response threshold corresponding to the minimum tire pressure is set in accordance with the invention by means of an external potentiometer. Therefore, with the normal tire pressure, the second trigger sets a flip-flop in each revolution of the wheel. The green display remains switched on and the tire pressure is all right.

If the tire pressure drops into a range which is undesirable, the sensor signal no longer reaches the threshold of the second trigger stage. At the fourth revolution of the wheel in that condition, the flip-flop is reset by way of the first trigger stage and the red display signals 'alarm'.

In order to reduce uncertainties in the display area, which occur for example due to bearing play in respect of the vehicle tire, statistic evaluation is intended to afford the option of suppressing error signals which are received in the interim. The peak values of the sensor amplitudes are distributed around a mean value which corresponds to the tire pressure which is actually set. If the trigger threshold is set to that value, then 50% of the signals are below that threshold and 50% are above. If more than 50% of the signals are above the reference value, the tire pressure is adequate, while if less than 50% of the signals are above the threshold value, the alarm stage comes into operation.

The signal which is dependent on tire pressure and which is produced by the Hall sensor, by virtue of the permanent magnet secured to the air-tightly closed side of the bellows, is converted in accordance with the invention into a display which is proportional to pressure. The signal may also be converted by way of an evaluation circuit into a direct pressure display, in digital or analog form.

When negotiating bends and when the vehicle is in another condition of being loaded at one side, then, besides the above-mentioned interference influences due to bearing play, substantial elastic deformation of the rim may also occur, which can be only partially compensated by virtue of statistic evaluation. Therefore, in accordance with the invention, besides the permanent magnet which is mounted to the bellows and which for the sake of simplicity is referred to hereinafter as the first permanent magnet and which moves relative to the stationary Hall sensor both in dependence on tire pressure and also in dependence on the rim, a second permanent magnet ay be fixedly mounted to the rim in such a way that it is at approximately the same spacing relative to the wheel centre as the first permanent magnet which is movable in dependence on pressure. Desirably, the second permanent magnet is positioned at the periphery of the rim in the vicinity of the first permanent magnet, but it may also be mounted opposite thereto or at another position (but on the same radius) as each portion of the rim has the same condition of deformation as it moves past the Hall sensor. The two permanent magnets then produce the same signals which are dependent on deformation, while upon changes in pressure the first permanent magnet which is disposed on the bellows produces an additional pressure-dependent voltage. Evaluation of the voltage signals in order to compensate for uncertainties is effected electronically, desirably by means of a microprocessor.

As a further improvement it is proposed that on its outside surface the bellows can be acted upon by the tire pressure, and at normal tire pressure the permanent magnet remains at a spacing which is predetermined relative to the measurement value sensor, that spacing decreasing with a reduced tire pressure. That construction has proven to be particularly effective in test situations.

Also in accordance with the invention, both in respect of bellows which are subjected to the loading of an external pressure, in accordance with this invention, and also in respect of a loading caused by an internal pressure, in accordance with the previous invention, in the concept of arranging the bellows in radial relationship to the axis, and disposing the measurement value sensor opposite to the permanent magnet in a radial direction relative to the axis.

An aspect of particular importance in relation to apparatuses disposed in parallel relationship to the axis, is that of inclining them at up to an angle of about 10° out of the parallel, in order thereby better to compensate for the outside forces acting on the wheel.

Further features are set forth herein.

BRIEF DESCRIPTION OF THE DRAWINGS

Further advantages, features and details of the invention will be apparent from the following description of preferred embodiments and with reference to the drawings in which.

DETAILED DESCRIPTION

Figure 4:
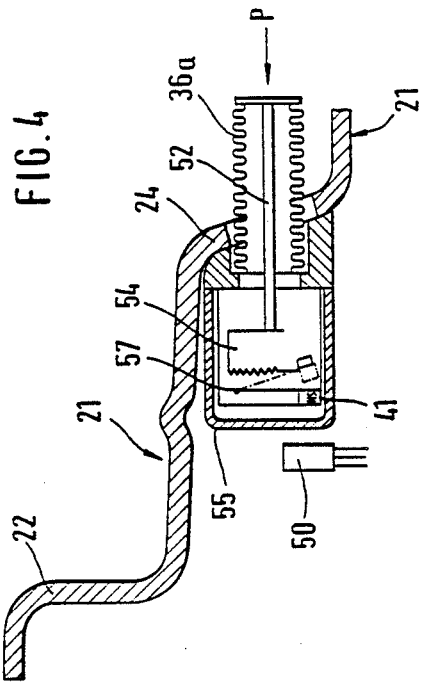
FIG. 4 is a view in section through a bellows seating in the rim ring without a sleeve and having a bistable display embodiments of the detail shown in FIG. 2.

A vehicle wheel 10 is fixed to the lower part of a spring leg 11 of a motor vehicle (not shown). The spring leg 11 ends with a steering knuckle arm 12, below which is shown a mounting joint 13 for a transverse link 14.

The vehicle wheel 10 comprises a wheel disc 20 which is fixed by screw means to a wheel hub 19 and which is rotatable about a stub axle 18, the wheel disc 20 having a rim ring 21 connected thereto. Edge beads 26 of a pneumatic tire 27 fit snugly against the rim flanges 22 of the rim ring 21, on both sides of a rim bed 23.

The laminate structure of the tire is not shown in the drawing for the sake of improved clarity.

Figure 2:
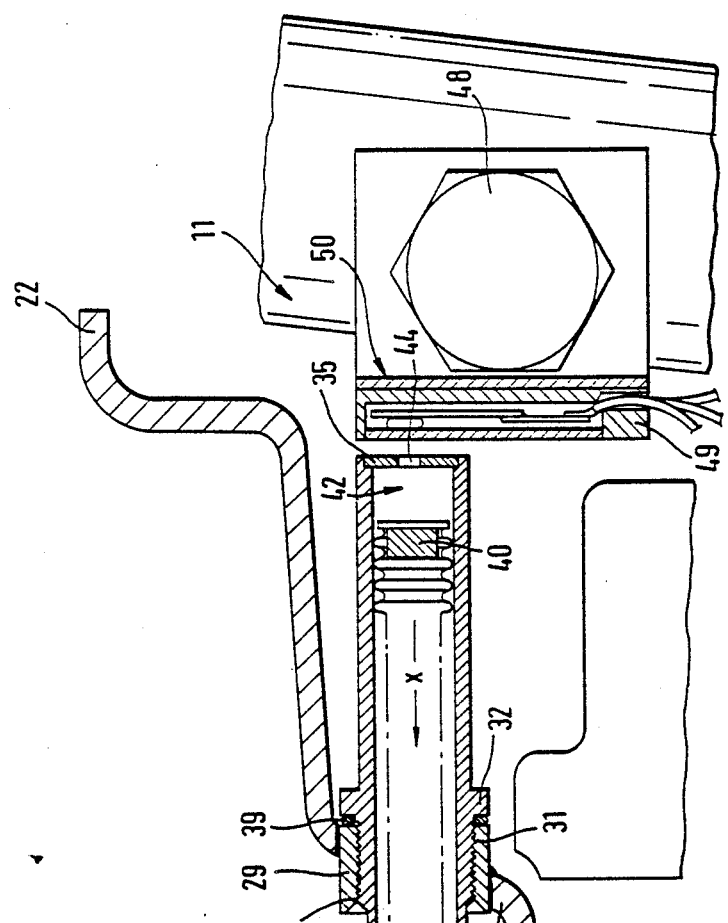
FIG. 2 is a detail of the sleeve seating in the rim ring according to FIG. 1 on an enlarged scale.

In the region of a step-like section 24 of the rim flange 22 which faces towards the spring leg 11, a sleeve 30 extends through the portion 24, the sleeve being approximately parallel to the axis line A. For that purpose, as shown in FIG. 2, fixed in the rim ring 21 is a screwthreaded sleeve 29 having a female screwthread 28 in which is carried a male screwthread 31 on the sleeve 30. A sealing O-ring 39 is disposed between the screwthreaded sleeve 29 and an annular rib 32 on the sleeve 30.

Extending in the sleeve 30 is a bellows 36 of a diameter d of for example 8 mm, with in this case ninety folds or corrugations as indicated at 37. The bellows 36 is supported towards the tire air space 25 against an inner annular shoulder 33 on the sleeve 30 so that the space 38 in the bellows communicates with the tire air space 25.

The other end of the bellows 36 is pressure-tightly closed and carries a permanent magnet 40. The inside surface 34 of the sleeve 30, with the end wall 35 thereof, delimits a sleeve ante-chamber 42.

If the pressure in the tire air space 25 falls, the permanent magnet 40 moves in the direction indicated by the arrow x and causes a reaction in a Hall sensor 50, the housing 49 of which is screwed to the spring leg 11 on a screw member 48. As the Hall sensor 50 responds to any movement of the permanent magnet 40, that produces a continuous display in respect of the tire pressure P.

Figure 3:
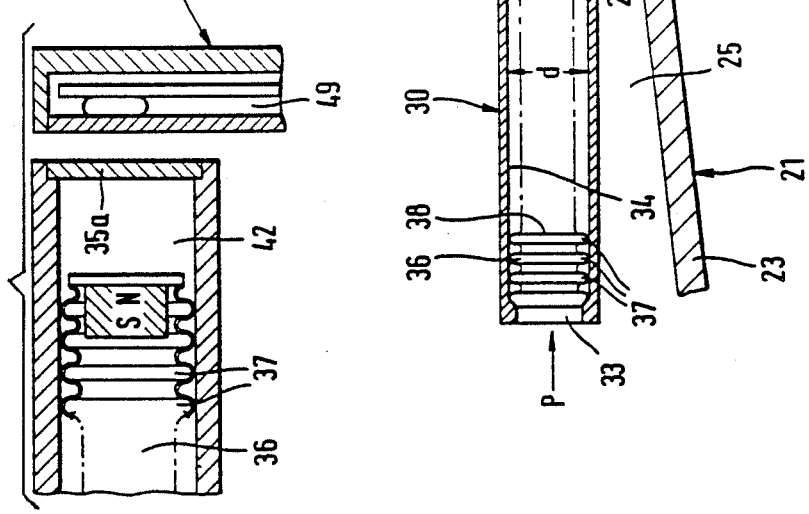
FIG. 3 is a view on an enlarged scale of the sleeve together with the Hall sensor of FIG. 2, in a further embodiment.

The embodiment shown in FIG. 3 does not have the vent opening 44 which can be seen in the end wall 35 of the sleeve 30. In FIG. 3 the sleeve end wall $35_a$ is closed and ante-chamber 42 has no air therein. The closed sleeve ante-chamber 42 prevents a drop in tire pressure and prevents fouling matter from penetrating into the sleeve 30, in the event of the bellows 36 leaking.

The embodiment shown in FIG. 4 concerns a bistable display. The bellows $36_a$, which in this case is without the sleeve 30, or a diaphragm which is used in a corresponding fashion, is acted upon at its end by the tire pressure P. A change in length of the bellows $36_a$ is transmitted by an axial bar 52 to a bistable lever system 54 in an attachment housing 55 on the rim ring 21. A snap lever, which is pivotally mounted at a pivot point 57, with permanent magnet 41, is moved from the 'good position' shown in FIG. 4 into a 'warning position' shown in broken lines, when there is a drop in tire pressure P; that movement of the lever with the permanent magnet 41 influences the Hall sensor 50 which is associated with the housing 55. The incoming signals of the Hall sensor 50 vary between 3.5 and 5 V, in the illustrated embodiment. The peak waves in respect of amplitude correspond to the tire pressure P.

Figure 5:
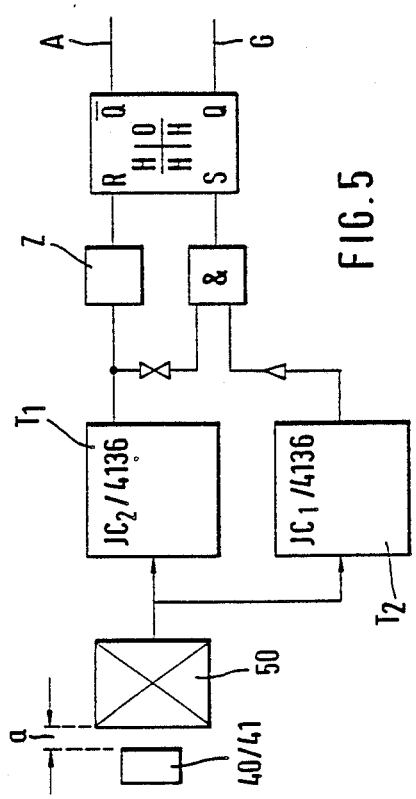
FIG. 5 is an operational diagram.

In a first trigger stage $T_1$ (see FIG. 5), a check is made to ascertain whether there is any wheel movement at all. In the second trigger stage $T_2$, the response threshold corresponding to the minimum tire pressure is set by means of an external potentiometer. With the normal tire pressure, the second trigger stage $T_2$ sets a flip-flop again, at each revolution of the wheel. For example a green display signals in that situation: 'tire pressure alright'.

If the tire pressure P should drop to an unacceptably low value, then the sensor signal no longer reaches the threshold of the second trigger stage $T_2$. At the fourth revolution of the wheel in that condition, the flip-flop is reset by way of the first trigger stage $T_1$ and a red display signal: 'alarm'.

The trigger stage $T_1$ forms the lower threshold and the trigger stage $T_2$ forms the upper threshold. When both thresholds are passed, the 'good' display G persists. If in contrast thereto only the lower threshold $T_1$ is reached, then 'alarm' A is lit up.

The signals of the Hall sensors 50 may be varied by external influences. In that connection it is possible for the amplitude peak values to be distributed around a mean value corresponding to the tire pressure P which is actually set. If the trigger threshold is set to that mean value, then for example 50% of the signals are below that threshold and 50% are above. In the above-mentioned circuit, the trigger threshold can be shifted downwardly by a voltage value corresponding to a drop in pressure by 0.2 bar. In that way, when the tire pressure P is in order, far above 50% of the signals reach the upper checking threshold of the trigger stage $T_2$. If the limit situation occurs, that is to say the tire pressure falls by 0.2 bar below the reasonable minimum, then that can be very easily recognized by counter components.

That method affords the option of forming a mean value from a large overall totality of signals to be evaluated, and displaying the mean value formed. That procedure is effected for example by the component Z in FIG. 5, by virtue of which five-cycle counting is possible. In that case, at least four excessively low generator signals are required to provide an alarm display.

Figure 6:
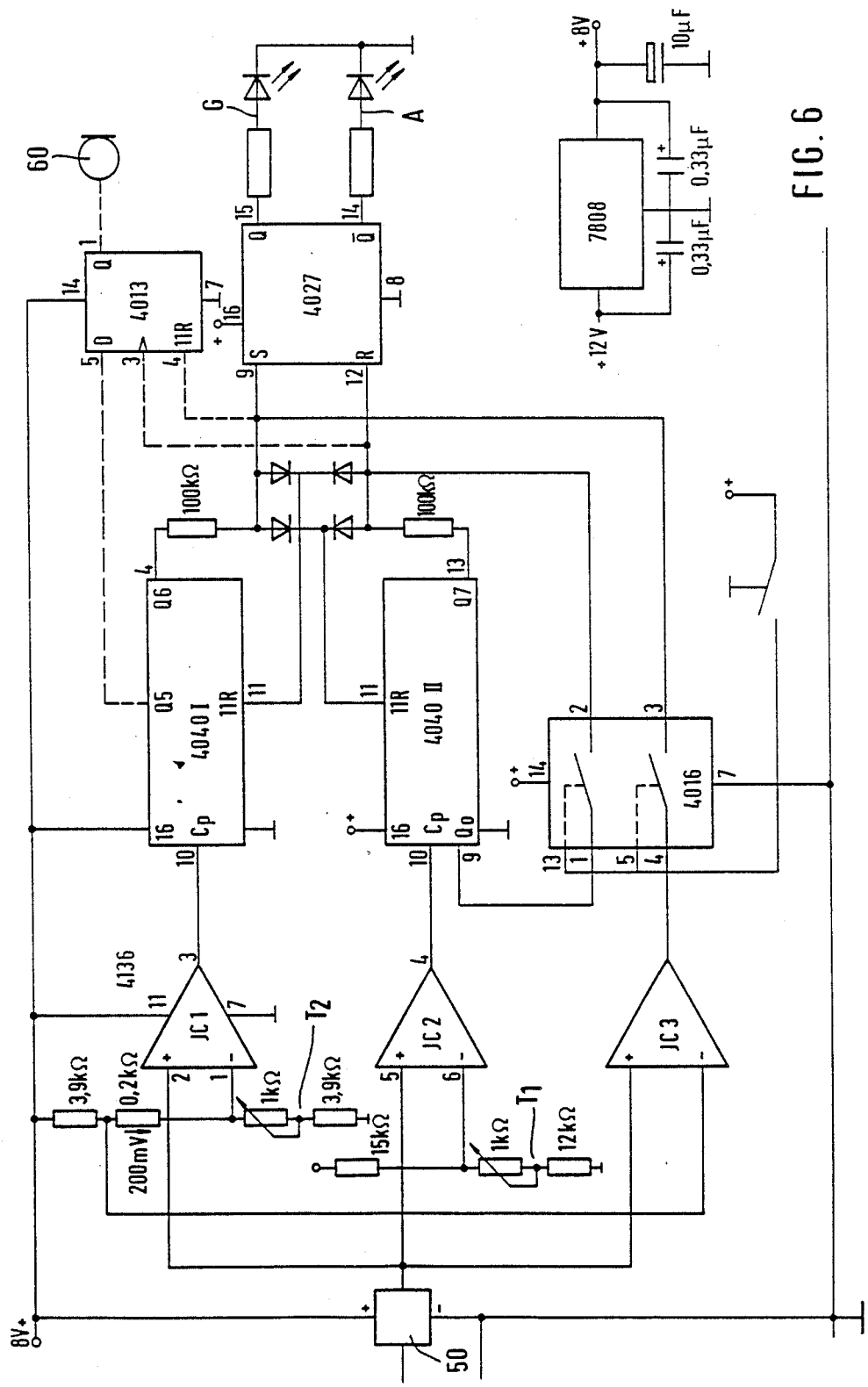
FIG. 6 is circuit diagram.

To round off, FIG. 6 shows a circuit diagram for statistical evaluation of the generator signals, as a possible example of the evaluation circuit. Identification references for the components are set out in the drawing. Instead of that electronic circuit, it is also possible to provide for signal processing by a microprocessor.

The drawing does not show a second permanent magnet which is mounted to the rim 21–23 in such a way that it is approximately at a spacing relative to the wheel center, which corresponds to the spacing from the wheel center of the permanent magnet 40 which is moved in dependence on pressure on the bellows 36.

Figure 1:
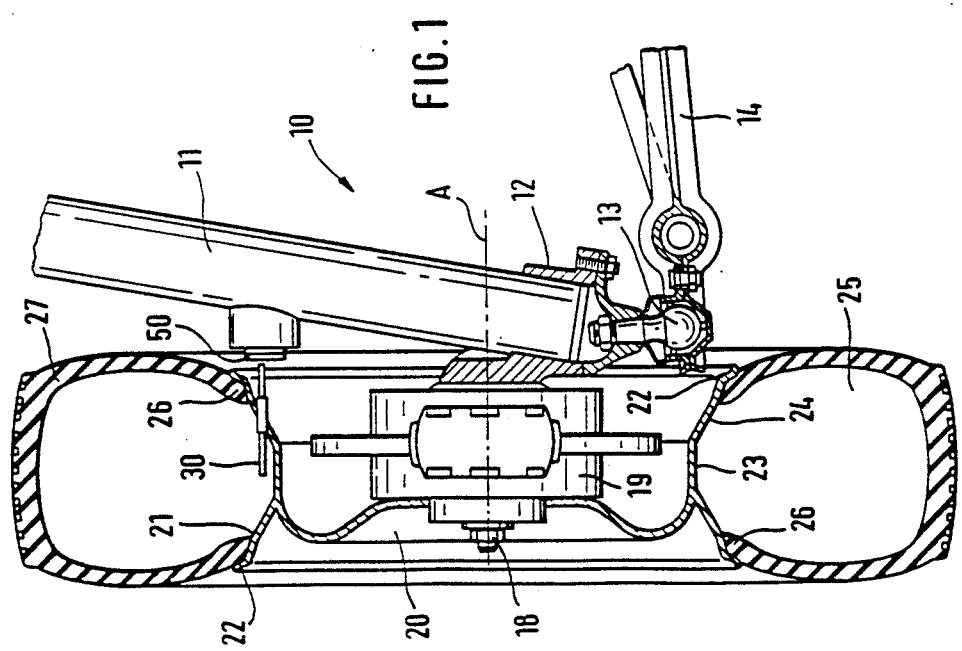
FIG. 1 is a view in longitudinal section of a spring leg of a motor vehicle with a vehicle tire connected thereto.

The laminate structure of the tire is not shown in the drawing, for the sake of improved clarity. In the region of a step-like section 24 of the rim flange 22 which is towards the spring leg 11, a sleeve which is in the form of a pressure tube 30 and which in FIG. 1 is substantially parallel to the axis line A passes through the section 24.

Figure 7:
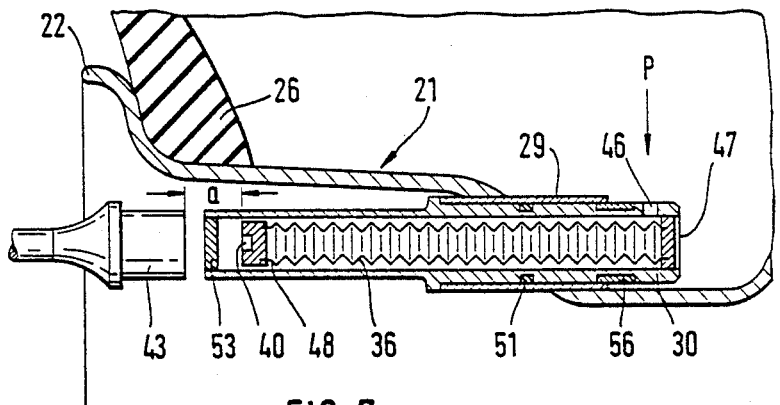
FIGS. 7 and 8 are views in section through further embodiments of the sleeve seating in the rim ring and having bellows and FIG. 9 is a detail of the sleeve of FIG. 8.

Referring to FIG. 7, fixed in the rim ring 21 is an outer sleeve 29 in which the pressure tube 30 is disposed. A sealing O-ring 51 is disposed between the outer sleeve 29 and the pressure tube 30 which is closed at its free end by a plate 53. The pressure tube 30 is fixed in the outer sleeve 29 by a retaining ring 56 of transparent material.

Extending in the pressure tube 30 is a metal bellows 36 which is fixed at one end to a bellows holder 47 and which is acted upon by the tire pressure P by way of a pressure tube opening 46. In that way a permanent magnet 40 which is fixed to the bellows 36 at the end thereof in a plate-like magnet holder 48 is moved in the axial direction.

A magnetic field sensor (Hall element) is fixed at 43 on the vehicle bodywork. The magnetic field strength acting on the magnetic field sensor is dependent on the spacing a between the permanent magnet 40 and the magnetic field sensor 43. Pulses whose amplitude value is proportional to the tire pressure are generated at the magnetic field sensor 43, when the tire is rotating.

Figure 8:
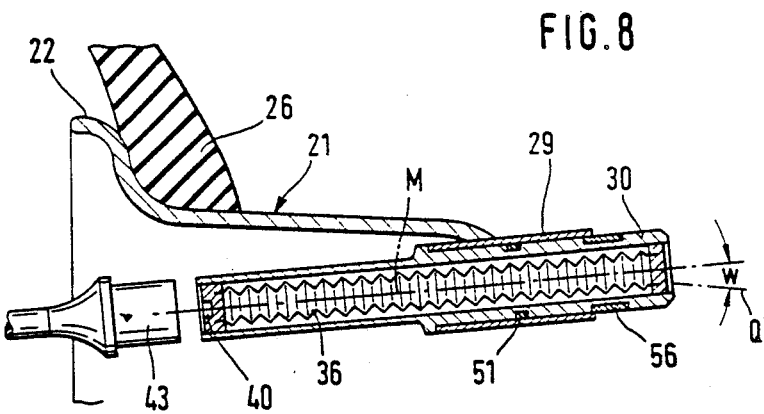
Figure 9:
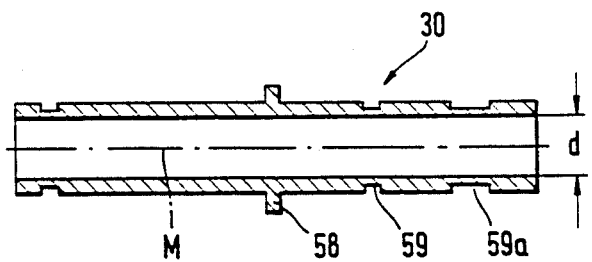

FIGS. 8 and 9 show another embodiment with a closed sleeve 30, the longitudinal axis M of which is inclined relative to a line Q parallel to the vehicle axles, at an angle W of up to about 10°.

The sleeve 30 which is of an inside diameter d of 8.3 mm in this case is provided with a radial abutment collar 58 and with circumferential recesses 59, $59_a$ or the O-ring 51 and the retaining ring 56.

The pressure tube 30 is provided with a longitudinal grooves 59, $59_a$ into which a projection on the outer sleeve 29 engages, and thus prevents the pressure tube 30 from rotating.

The drawing does not illustrate an embodiment with a permanent magnet 40 which is displaceable in a radial direction relative to the axis, and a measurement value sensor which is disposed radially in opposite relationship thereto.

The influence of centrifugal force on the measurement value sensor is compensated by way of a microprocessor which evaluates the rotary speed information.

Temperature influences are displayed by a temperature sensing element in order to be able to compensate for the influence of temperature in respect of tire pressure.

We claim:

1. Apparatus for monitoring the air pressure in a pneumatic tire carried by the rim of a vehicle wheel which comprises: a pneumatic tire having a tire air space; a vehicle wheel having a rim carrying said tire along an axis; a sensing element arranged at the rim which can be deformed and acted upon by tire pressure;

a permanent magnet as a measurement value generator connected to the sensing element; a measurement value sensor in operative relationship to the permanent magnet arranged in the region of rotary movement of the wheel and fixed to the vehicle in a stationary position; an evaluation circuit connected to the measurement value sensor; wherein the sensing element is in the form of a bellows mounted with a substantially axis-parallel direction of movement; and wherein the permanent magnet which is connected to the sensing element is displaceable in axis-parallel relationship at the outside of the tire in dependence on the tire pressure, wherein at normal tire pressure the permanent magnet remains in a position close to the measurement value sensor with a greater spacing therebetween at reduced tire pressure, said apparatus including an attachment housing on the rim with said bellows projecting from said attachment housing into the tire air space, a bistable rocker member for moving said permanent magnet and an axial rod connecting said bellows with said rocker member, wherein said permanent magnet is mounted in axis-parallel relationship.

2. Apparatus according to claim 1 including a sleeve having an end wall with the bellows fitted into the sleeve and wherein the sleeve passes through the rim and the bellows is open to the tire air space, wherein the bellows is pressure-tightly closed at the other end and carries the permanent magnet which is displaceable in the sleeve, a sleeve ante-chamber provided between the permanent magnet and the end wall of the sleeve.

3. Apparatus according to claim 1 wherein the measurement value sensor is a Hall sensor and is connected to two trigger stages which determine lower and upper thresholds of a circuit.

4. Apparatus according to claim 1 including an associated microprocessor for compensation of the influence of centrifugal force on the measurement value sensor by means of computation by way of rotary speed information.

5. Apparatus for monitoring the air pressure in a pneumatic tire carried by the rim of a vehicle wheel which comprises: a pneumatic tire having a tire air space; a vehicle wheel having a rim carrying said tire along an axis; a sensing element arranged at the rim which can be deformed and acted upon by tire pressure; a permanent magnet as a measurement value generator connected to the sensing element; a measurement value sensor in operative relationship to the permanent magnet arranged in the region of rotary movement of the wheel and fixed to the vehicle in a stationary position; an evaluation circuit connected to the measurement value sensor; wherein the sensing element is in the form of a bellows mounted with a substantially axis-parallel direction of movement; and wherein the permanent magnet which is connected to the sensing element is displaceable in axis-parallel relationship at the outside of the tire in dependence on the tire pressure, wherein at normal tire pressure the permanent magnet remains in a position close to the measurement value sensor with a greater spacing therebetween at reduced tire pressure, said apparatus including a sleeve having an end wall with the bellows fitted into the sleeve and wherein the sleeve passes through the rim and the bellows is open to the tire space, wherein the bellows is pressure-tightly closed at the other end and carries the permanent magnet which is displaceable in the sleeve, a sleeve ante-chamber provided between the permanent magnet and the end wall of the sleeve.

6. Apparatus according to claim 5 wherein the sleeve ante-chamber is provided with a venting opening.

7. Apparatus according to claim 6 wherein the sleeve ante-chamber is a sealed air-free chamber.

8. Apparatus according to claim 6 wherein the sleeve ante-chamber contains an air cushion.

9. Apparatus according to claim 5 wherein the permanent magnet is arranged to be displaceable radially relative to the axis and the measurement value sensor is disposed in opposite relationship to the permanent magnet in a radial direction.

10. Apparatus for monitoring the air pressure in a pneumatic tire carried by the rim of a wheel which comprises: a pneumatic tire having a tire air space; a vehicle wheel having a rim carrying said tire along an axis; a sensing element arranged at the rim which can be deformed and acted upon by tire pressure; a permanent magnet as a measurement value generator connected to the sensing element; a measurement value sensor in operative relationship to the permanent magnet arranged in the region of rotary movement of the wheel and fixed to the vehicle in a stationary position; an evaluation circuit connected to the measurement value sensor; wherein the sensing element is in the form of a bellows and wherein the permanent magnet is connected to the sensing element and is displaceable in dependence on the tire pressure; and wherein the bellows is inclined at an angle of up to 10° relative to the axles of the vehicle.

11. Apparatus for monitoring the air pressure in a pneumatic tire carried by the rim of a vehicle wheel which comprises: a pneumatic tire having a tire air space; a vehicle wheel having a rim carrying said tire along an axis; a sensing element arranged at the rim which can be deformed and acted upon by tire pressure; a permanent magnet as a measurement value generator connected to the sensing element; a measurement value sensor in operative relationship to the permanent magnet arranged in the region of rotary movement of the wheel and fixed to the vehicle in a stationary position; an evaluation circuit connected to the measurement value sensor; wherein the sensing element is in the form of a bellows with a substantially axis-parallel direction of movement; and wherein the permanent magnet which is connected to the sensing element is displaceable in axis-parallel relationship at the outside of the tire in dependence on the tire pressure, wherein at normal tire pressure the permanent magnet remains in a position close to the measurement value sensor with a greater spacing therebetween at reduced tire pressure, said apparatus including an associated microprocessor for compensation of the influence of centrifugal force on the measurement value sensor by means of computation by way of rotary speed information.

12. Apparatus for monitoring air-pressure in a pneumatic tire carried by the rim of a vehicle wheel which comprises: a pneumatic tire having a tire air space; a vehicle wheel having a rim carrying said tire along an axis; a sensing element arranged at the rim which can be deformed and acted upon by tire pressure; a permanent magnet as a measurement value generator connected to the sensing element; a measurement value sensor in operative relationship to the permanent magnet arranged in the region of rotary movement of the wheel and fixed to the vehicle in a stationary position; an evaluation circuit connected to the measurement value sensor; wherein the sensing element is in the form of a bellows; and wherein the permanent magnet which is connected to the sensing element is displaceable in dependence on the tire pressure and rests at a spacing which is predetermined relative to the measurement value sensor at normal tire pressure, and said spacing is smaller with a reduced tire pressure, said apparatus including a sleeve surrounding said bellows wherein the sleeve includes at least one opening towards the interior of the tire, and is otherwise closed.

13. Apparatus according to claim 12 including a sleeve surrounding said bellows wherein the sleeve includes at least one opening towards the interior of the tire, and is otherwise closed.

14. Apparatus according to claim 12 wherein the sleeve has a longitudinal axis and the opening is arranged radially with respect to the longitudinal axis of the sleeve.

15. Apparatus according to claim 12 wherein the bellows is fixed at one end to the sleeve and is closed at the other end by a magnet holder.

16. Apparatus according to claim 12 wherein the sleeve is in the form of a pressure tube.

17. Apparatus according to claim 12 wherein the sleeve is fixed in such a way as to prevent it from rotating.

18. Apparatus according to claim 17 including a portion embracing said sleeve, wherein the means for preventing rotary movement is a connection between the sleeve and the portion embracing same.

19. Apparatus for monitoring the air pressure in a pneumatic tire carried by the rim of a vehicle wheel which comprises: a pneumatic tire having a tire air space; a vehicle wheel having a rim carrying said tire along an axis;. a sensing element arranged at the rim which can be deformed and acted upon by tire pressure; a permanent magnet as a measurement value generator connected to the sensing element; a measurement value sensor in operative relationship to the permanent magnet arranged in the region of rotary movement of the wheel and fixed to the vehicle in a stationary position; an evaluation circuit connected to the measurement value sensor; wherein the sensing element is in the form of a bellows mounted with a substantially axis-parallel direction of movement; and wherein the permanent magnet which is connected to the sensing element is displaceable in axis-parallel relationship at the outside of the tire in dependence on the tire pressure, wherein at normal tire pressure the permanent magnet remains in a position close to the measurement value sensor with a greater spacing therebetween at reduced tire pressure, and wherein the measurement value sensor is a Hall sensor and is connected to two trigger stages which determine lower and upper thresholds of a circuit.

20. Apparatus according to claim 19 wherein a good signal is triggered if the signal passes through both the lower and upper threshold and an alarm signal is triggered if the signal coming from the Hall sensor reaches only the lower threshold.

21. A method of monitoring the air pressure in a vehicle tire by means of an apparatus according to claim 19 wherein the electrical signal coming from the Hall sensor is converted into a display which is proportional to pressure.

* * * * *